United States Patent
Vorndran et al.

(10) Patent No.: US 6,424,901 B1
(45) Date of Patent: Jul. 23, 2002

(54) METHOD OF CALCULATING FOR THE SPEED CONTROL OF A CVT

(75) Inventors: Ralf Vorndran, Eriskirch; Wolfgang Danz, Friedrichshafen; Friedrich Reiter, Kressbronn; Andreas Piepenbrink, Meersburg; Andreas Schwenger, Friedrichshafen, all of (DE)

(73) Assignee: ZF Batavia L.L.C., Batavia, OH (US)

( * ) Notice: Subject to any disclaimer, the term of this patent is extended or adjusted under 35 U.S.C. 154(b) by 0 days.

(21) Appl. No.: 09/643,915

(22) Filed: Aug. 23, 2000

(30) Foreign Application Priority Data

Sep. 10, 1999 (DE) .......................... 199 43 335

(51) Int. Cl.$^7$ .................................. G06F 7/00
(52) U.S. Cl. .................. 701/51; 701/58; 701/59; 477/37; 477/38; 477/44
(58) Field of Search ............... 701/51, 60, 57, 701/61, 58, 59; 477/43, 46, 48, 49, 115; 475/78, 80, 214, 216

(56) References Cited

U.S. PATENT DOCUMENTS 5,052,247 A * 10/1991 Kato et al. .................. 477/49
5,421,790 A * 6/1995 Lasoen ....................... 475/78
5,695,427 A * 12/1997 Sato et al. ................... 477/43
5,720,687 A * 2/1998 Bennett ...................... 475/214
5,938,557 A * 8/1999 Greenwood ................ 475/216

FOREIGN PATENT DOCUMENTS

| DE | 196 06 311 A1 | 8/1997 | ........... F16H/59/06 |
| DE | 196 20 328 A1 | 11/1997 | ........... B60K/23/00 |
| DE | 197 48 527 A1 | 5/1998 | ........... G05B/17/00 |
| DE | 199 08 251.0 | 8/2000 | |
| JP | 60060359 A | * 4/1985 | |
| JP | 09026021 A | 1/1997 | ........... F16H/61/00 |
| JP | 2000120831 A | * 4/2000 | |
| WO | 97/44600 | 11/1997 | ........... F16H/61/20 |

* cited by examiner

Primary Examiner—Jacques H. Louis-Jacques
(74) Attorney, Agent, or Firm—Davis & Bujold, P.L.L.C.

(57) ABSTRACT

Within the scope of the method for including the temperature in the calculation of the definite, operating-point dependent maximum and minimum adjustment speeds in a continuously variable belt-drive transmission, the actual limiting values for the maximum possible adjustment gradient are continuously calculated in every operating state by a physical-mathematical pattern wherein the hydraulic routes of the variator, the clutches integrated in the transmission and the lubrication are modeled as laminar inserts and the route of the control unit leakage as coupled laminar and turbulent hydraulic transmission elements.

5 Claims, 1 Drawing Sheet

METHOD OF CALCULATING FOR THE SPEED CONTROL OF A CVT

FIELD OF THE INVENTION

According to the preamble of claim 1, this invention concerns a method for including the temperature in the calculation of the definite, operating-point dependent maximum and minimum adjustment speeds of a variator in a continuously variable transmission having electrohydraulic control.

BACKGROUND OF THE INVENTION

A continuously variable belt-drive transmission usually consists, among others, of a starting unit, a forward/reverse drive unit, an intermediate shaft, differential hydraulic and electronic control devices and a variator. The variator usually comprises a primary and a secondary pulley, also called primary and secondary sides, both pulleys being formed by beveled pulleys disposed in pairs and provided with a torque-transmitting belt-drive element that rotates between the two pairs of beveled pulleys.

In such a transmission the actual ratio is defined by the running radius of the belt-drive element which in turn is a function of the axial position of the beveled pulleys.

Compared with a standard selector transmission, continuously variable transmissions in general have, conditioned by principle, one more degree of freedom, since aside from the selection of the ratio step to be adjusted, it is also possible to predetermine and control the adjustment speed at which the ratio is transferred from one operating point to the other.

In continuously variable transmissions having a belt-drive element (e.g. belt, chain) as the torque-transmitting part, it results from the structural design that during a change of ratio the beveled pulley pairs of the primary and secondary sides of the variator, alternately and complementary to each other, are pushed apart and together by corresponding control elements, whereby a change of the running radius of the belt-drive element acts upon the beveled pulleys thus causing a change of ratio between the primary and secondary sides.

The variator is usually hydraulically controlled. The axial displacement of the beveled pulleys produces a change of volume which, since the adjustment occurs under force and pressure control, must be compensated by the control hydraulic system through adequate flow rate changes to the respective pair of beveled pulleys.

The change of flow rate to be adjusted, via the electrohydraulic control at the same time depends directly on the actual adjustment speed of the pair of beveled pulleys.

Since the control hydraulic system as a rule is supplied via a pump dependent on rotational speed of the engine, with definitely predetermined maximum flow rate, there necessarily results a definitely stationary limit for the implementable adjustment dynamic of the variator. The variator can only be adjusted as quickly as the admitted available oil flow rate, in interplay with other control and regulating circuits or consumers.

In the structural design of the supply pump, together with assuring the necessary oil flow rate, an essential part is played by aspects such as noise and efficiency, both of which as a rule have a negative effect as the size of the pump increases. As a result, for a structural pump design, a compromise has to be implemented between the different criteria, which in relation to the operating point and the individual criteria is a less than optimum solution.

In relation to the variable adjustment speeds of the variator, this means there will always be operating states where in theory there would be possible higher adjustment gradients than momentarily admitted by the actual availability of the flow rate.

These operating states are particularly critical for a superimposed control device, since the control without the transmitting medium oil, cannot affect the behavior of the variator and thus the ratio adjustment. The consequence is instabilities which can produce disturbing oscillations of rotational speed until destroying the mechanics of the transmission.

Design-conditioned limitations (strengths of structural parts, limiting values for control pressures) on the variator constitute another aspect which likewise must constantly be taken into account to prevent damage or even destruction of the mechanics of the transmission.

A simple possible implementation would be to set for the admissible adjustment gradient empirical limiting values removed far enough from the critical values. The disadvantage is that the possible adjustment potential in this case cannot be utilized to the required extent. Besides, a generalization is hardly possible with regard to security in all operating states.

The Applicant's patent application (DE 199 08 251.0) discloses a method which by means of a physical mathematical pattern continuously calculates in every operating state the actual limiting values for the maximum possible adjustment gradient. Here are taken into consideration the special limiting conditions of the oil supply, and geometric ratios on the variator conditioned by the design.

Thus, the leakage flow rate of the different consumers such as the primary and secondary sides of the variator, S1 and S2 respectively, of the forward clutch KV, of the brake BR, and of the converter lock-up clutch WK are taken into account, according to the respectively applied pressure ps1, ps2, pkv and pwk.

The superimposed control device for adjusting a predetermined ratio set value then takes into account said limiting values when generating the correcting variables.

Herein is used a control circuit structure such as described in the Applicant's patent No. DE 196 06 311 A1. Such control circuit structures combine a physical-mathematical pattern-based linearization of the control method by means of a correcting member with a linear PID regulator. The correcting variable of the PID regulator is directly interpreted as the standard for the adjustment gradient to be set.

SUMMARY OF THE INVENTION

The problem on which this invention is based is to outline, departing from the cited prior art, a method for including temperature in the calculation and taking into consideration the define operating-point dependent maximum and minimum adjustment speeds within the scope of the ratio control of a continuously variable belt-drive transmission having electrohydraulic control.

According to the invention said problem is solved with the features of claim 1. Other embodiments of the invention result form the sub-claims.

BRIEF DESCRIPTION OF THE DRAWING

The invention will now be described, by way of example, with reference to the accompanying drawings in which.

DETAILED DESCRIPTION OF THE INVENTION

Figure 1:
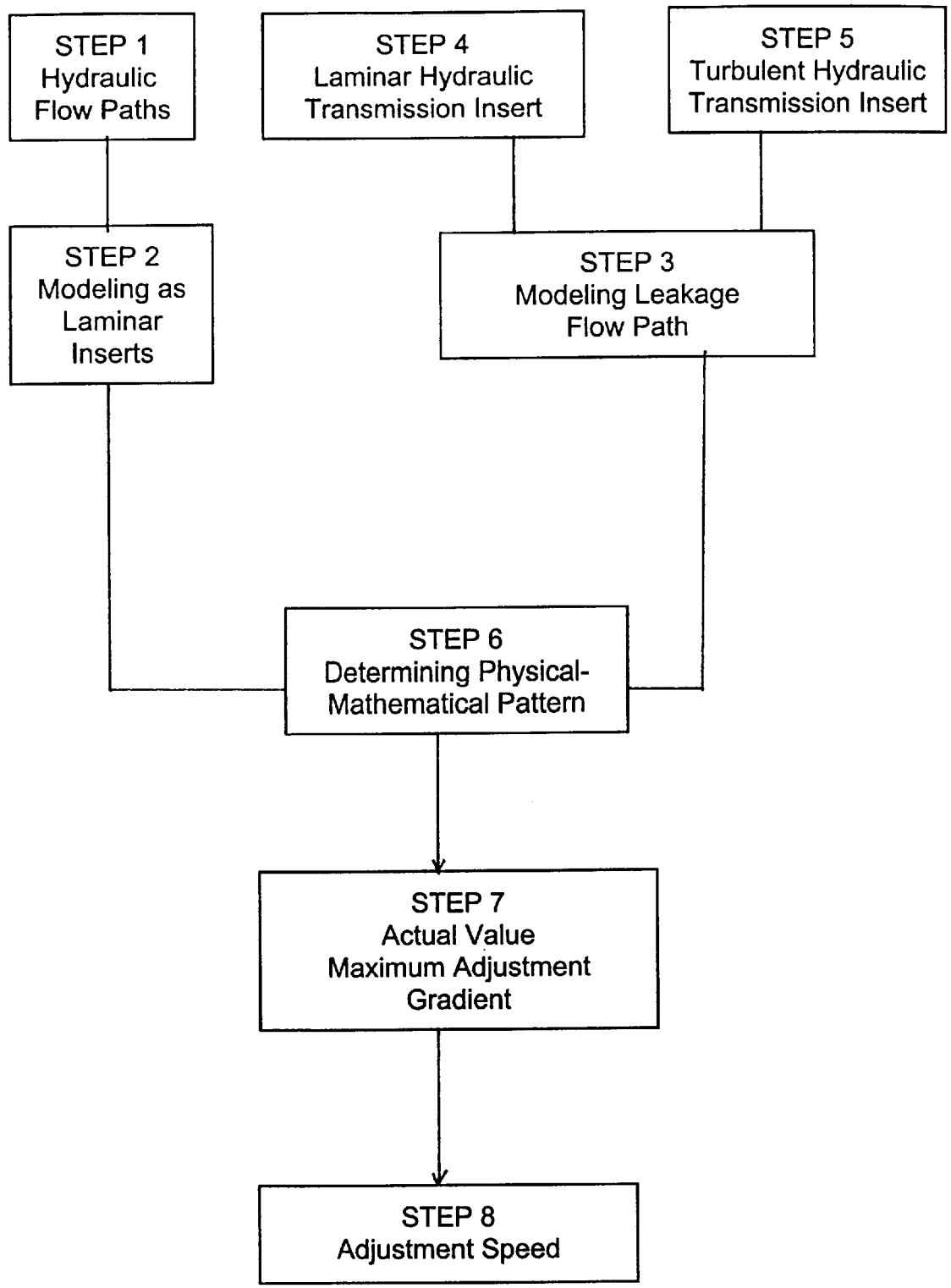
FIG. 1 is a flow chart of the current invention.

It is accordingly proposed to model the hydraulic routes of the variator, of the clutches integrated in the transmission and of the lubrication (for ex., ps1 and ps2 for the variator pulleys, pkv for the forward clutch, pwk for the torque converter clutch and psm (return to the tank, lubrication)) (Step 1) as laminar inserts (Step 2) and the route of the control unit leakage (Step 3) as coupled laminar (Step 4) and turbulent (Step 5) hydraulic transmission elements.

The advantage of this procedure is that essentially complicated relationships of the oil circuit can be described very easily and with sufficient precision by the simplest pressure-temperature volume equations and an easy alignment to the measuring point is possible.

A more precise inclusion of the geometry in the composition of the pattern is not necessary and proceeds globally in coefficients and characteristic fields calculated from density and viscosity of the kind of oil used.

A special characteristic of the function is that the variables pressure, temperature and flow rate are accounted for in a hydraulic form as laminar, turbulent or mixed inserts. The alignment with the measurement occurs only at a measuring point.

Within the scope of the inventive method the structural, and the flow rate limiting values for the adjustable speed, are calculated with reference to a physical-mathematical pattern (Step 6) taking into account the temperature influences.

In this connection is used a method for extrapolation over the whole temperature range with reference to measured data in a limited temperature graph.

In addition, a fundamental calculation precept is indicated for the temperature-dependent variables (leakage flow rates).

According to an advantageous variant, for modeling the routes ps1 and ps2 for the variator pulleys, pkv for the forward clutch, pwk for the torque converter clutch and psm as laminar inserts (Steps 1, 2) according to the pattern equation for laminar flow:

$$q = \frac{k}{\eta(c\_getr)} \cdot p \qquad \text{G1:1}$$

the flow rate q of the hydraulic route is calculated according to the invention. The pressure p is used as a set value from the flow standard of the pressure regulator and with the appertaining flow-pressure characteristic line. At a temperature point $c\_getr=T_k$ the factor k corresponding to the basic viscosity characteristic line $\eta(c\_getr)$ is determined as $$k = q(c\_getr = T_k)\frac{\eta(c\_getr = T_k)}{p}, \qquad \text{G1:2}$$

wherein $q(c\_getr=T_k)$ at this operating point is measured leakage flow rate.

Since according to the pattern illustration k is a temperature-independent system constant, it is now possible to calculate via G1.1 the leakage flow rate over the whole temperature range.

To model the hydraulic route of the control unit leakage within the scope of a mixed insert composition, the flow rate q of the hydraulic route of the control unit leakage is calculated according to the equation $$q = k(ps2, phd) \cdot \sqrt{\frac{2}{p(c\_getr)} \cdot ps2 \frac{phd}{\eta(c\_getr)}} \qquad \text{G1:3}$$

as a function of both pressures ps2 and phd (system pressure). Said pressures are used as set values from the flow standards of the pressure regulators and with the appertaining flow-pressure characteristic field, k is determined according to the basic viscosity characteristic line $\eta(c\_getr)$ and the density characteristic line $\eta(c\_getr)$, and with the leakage flow rate measured at this operating point $q(c\_getr=T_k)$:

$$k(ps2, phd) = \frac{q(c\_getr = T_k)}{\sqrt{\frac{2}{p(c\_getr = T_k)} \cdot ps2 \frac{phd}{\eta(c\_getr = T_k)}}} \qquad \text{G1:4}$$

Since k is a temperature-independent system constant, the leakage flow rate can be calculated over the whole temperature range via G1.3.

What is claimed is:

1. A method of calculating an adjustment speed of a variator of a continuously variable belt-drive transmission in which the transmission comprises at least one operating point and at least one state of operation, at least one clutch having at least one hydraulic flow path, a lubrication means having hydraulic flow paths, a lubrication means having hydraulic flow paths, said variator including at least one hydraulic flow path, and a control unit having a leakage flow path, and wherein said adjustment speed comprises an adjustment gradient, comprising the steps of:

for each said state of operation of said transmission,
continuously calculating via a physical-mathematical pattern an actual value for a maximum adjustment gradient,
said pattern comprising a model combining the at least one hydraulic flow path of the clutch, the hydraulic flow paths of the lubrication means, the at least one hydraulic flow path of the variator and the leakage path of the control unit, including the steps of:
modeling each of the said hydraulic flow paths as a laminar insert, and
modeling said leakage flow path as an element coupling a laminar hydraulic transmission insert and a turbulent hydraulic transmission insert.

2. The method according to claim 1, further comprising the steps of:

utilizing a pressure variable, a temperature variable and a flow rate variable, and calculating each variable as one of a laminar insert, a turbulent insert, and a mixed insert in a hydraulic form.

3. The method according to claim 1, further comprising the steps of:

determining the temperature variable of measured data from a limited temperature graph, and
extrapolating said data over an entire temperature range of the transmission for the at least one operating point.

4. The method according to claim 3, further comprising the steps of:

forming the variator with a first hydraulic flow path and a second hydraulic flow path, forming the clutch with a forward clutch hydraulic flow path and a torque converter clutch hydraulic flow path, wherein
the lubrication hydraulic flow path comprises a return path to lubrication tank, and the transmission further comprises at least one pressure regulator wherein,
the pressures of said flow paths, ps2, pkv, pwk, and psm are each modeled as laminar inserts, and
a flow rate q of each of said modeled flow paths is calculated by an equation:

$$q = \frac{k}{\eta(c\_getr)} \cdot p$$

wherein a pressure p from a flow standard of the at least one pressure regulator having at least one appertaining flow-pressure characteristic line is used as a set value, and
a characteristic field factor is determined by an equation:

$$k = q(c\_getr = T_k) \frac{\eta(c\_getr = T_k)}{p}$$

by measuring at a temperature point $T_k$, taking into account a basic viscosity characteristic line $\eta(c\_getr)$ and a leakage flow rate $q(c\_getr=T_k)$ measured at the at least one operating point.

5. The method according to claim 4, further comprising the step of:

modeling leakage hydraulic flow path of the control unit as an element coupling a laminar hydraulic transmission insert and a turbulent hydraulic transmission insert, a flow rate q, is calculated with reference to an equation $$q = k(ps2, phd) \cdot \sqrt{\frac{2}{p(c\_getr)} \cdot ps2 \frac{phd}{\eta(c\_getr)}}$$

as function of both pressure ps2 and a system pressure phd, said pressures ps2 and phd being used as set values from the flow standard of the at least one pressure regulator and the at least one appertaining flow-pressure characteristic line, and the characteristic field k being determined at a temperature operating point $T_k$ according to each of the basic viscosity line $\eta(c\_getr)$ and the density line $\eta(c\_getr)$, and the leakage flow rate $q(c\_getr=T_k)$ measured at the at least one operating point is established by means of an equation.

$$k(ps2, phd) = \frac{q(c\_getr = T_k)}{\sqrt{\frac{2}{p(c\_getr = T_k)} \cdot ps2 \frac{phd}{\eta(c\_getr = T_k)}}} \cdot$$

\* \* \* \* \*